(12) United States Patent
Kim et al.

(10) Patent No.: US 11,395,229 B2
(45) Date of Patent: Jul. 19, 2022

(54) METHOD FOR RECEIVING FRAME IN WIRELESS LAN SYSTEM, AND WIRELESS TERMINAL USING SAME

(71) Applicant: LG ELECTRONICS INC., Seoul (KR)

(72) Inventors: Suhwook Kim, Seoul (KR); Kiseon Ryu, Seoul (KR); Jeongki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 16/608,800

(22) PCT Filed: Apr. 27, 2018

(86) PCT No.: PCT/KR2018/004891
§ 371 (c)(1),
(2) Date: Oct. 25, 2019

(87) PCT Pub. No.: WO2018/199670
PCT Pub. Date: Nov. 1, 2018

(65) Prior Publication Data
US 2020/0196243 A1    Jun. 18, 2020

Related U.S. Application Data

(60) Provisional application No. 62/491,222, filed on Apr. 27, 2017.

(51) Int. Cl.
*H04W 52/02* (2009.01)
*H04L 1/18* (2006.01)
(Continued)

(52) U.S. Cl.
CPC ....... *H04W 52/0235* (2013.01); *H04L 1/1812* (2013.01); *H04W 56/001* (2013.01); *H04W 84/12* (2013.01)

(58) Field of Classification Search
CPC .......... H04W 52/0235; H04W 56/001; H04W 84/12; H04L 1/812
See application file for complete search history.

(56) References Cited

U.S. PATENT DOCUMENTS

2013/0336188 A1    12/2013  Yomo et al.
2014/0112229 A1     4/2014  Merlin et al.
(Continued)

FOREIGN PATENT DOCUMENTS

CN    105052209    11/2015
CN    105165074    12/2015
(Continued)

OTHER PUBLICATIONS

PCT International Application No. PCT/KR2018/004891, International Search Report dated Aug. 13, 2018, 4 pages.
(Continued)

*Primary Examiner* — Mohammad S Anwar
(74) *Attorney, Agent, or Firm* — Lee Hong Degerman Kang Waimey

(57) ABSTRACT

The present embodiment relates to a method for receiving a frame by a first wireless terminal in a wireless LAN system, the method comprising the steps of: transmitting a WUR parameter request frame including capability information of a first wireless terminal, which is related to a low power mode, to a second wireless terminal; receiving, from the second wireless terminal, a WUR parameter response frame including operation information approved by the second wireless terminal on the basis of the capability information, wherein the operation information includes time information for a first WUR beacon frame to be transmitted by the second wireless terminal; after receiving the WUR parameter response frame, transmitting a WUR mode request frame to the second wireless terminal in order to enter a low power mode; and when an ACK frame relating to the WUR (Continued)

mode request frame is received from the second wireless terminal, performing operation in the low power mode on the basis of the operation information, wherein the first WUR beacon frame is received in a WUR module according to the time information.

8 Claims, 17 Drawing Sheets

(51) Int. Cl.
*H04W 56/00* (2009.01)
*H04W 84/12* (2009.01)

(56) References Cited

U.S. PATENT DOCUMENTS

| | | | |
|---|---|---|---|
| 2014/0126442 A1 | 5/2014 | Jafarian et al. | |
| 2014/0204822 A1 | 7/2014 | Park et al. | |
| 2015/0078229 A1 | 3/2015 | Choi et al. | |
| 2016/0374018 A1 | 12/2016 | Min et al. | |
| 2016/0374019 A1* | 12/2016 | Park | H04L 5/0053 |
| 2018/0007629 A1* | 1/2018 | Dorrance | H04L 27/06 |
| 2018/0020405 A1* | 1/2018 | Huang | H04W 52/0229 |
| 2018/0041961 A1* | 2/2018 | Huang | H04W 52/0216 |
| 2018/0049130 A1* | 2/2018 | Huang | H04W 56/001 |

FOREIGN PATENT DOCUMENTS

| | | |
|---|---|---|
| CN | 105981452 | 9/2016 |
| CN | 106102149 | 11/2016 |

OTHER PUBLICATIONS

Minyoung Park, et al., "LG-WUR (Low-Power Wake-Up Receiver) follow-up", doc.: IEEE 802.11-16/0341r0, Mar. 2016, 10 pages.

John Son, et al., "Wake-up and data exchange sequences", doc.: IEEE 802.11-16/1470r0, Nov. 2016, 4 pages.

Po-Kai Huang, et al., "WUR negotiation and acknowledgment procedure follow-up", doc.: IEEE 802.11-17/0342r4, Mar. 2017, 18 pages.

European Patent Office Application Serial No. 18791918.8, Search Report dated Mar. 3, 2020, 10 pages.

Huang, P. et al., "High Level MAC Concept for WUR," doc.: IEEE 802.11-17/0071r0, Jan. 2017, 9 pages.

Huang, P. et al., "WUR Beacon," doc.: IEEE 802.11-17/0343r3, Mar. 2017, 15 pages.

Ryu, K. et al., "Overall MAC Procedure for WUR," doc.: IEEE 802.11-16/1445r1, Nov. 2016, 10 pages.

Wu, T. et al., "WUR duty cycle mode and timing synchronization," doc.: IEEE 802.11-17/0371r4, Mar. 2017, 15 pages.

Chu, L., "Synchronization with Low Power Antenna," doc.: IEEE 802.11-17/0447r0, Jan. 2017, 6 pages.

The State Intellectual Property Office of the People's Republic of China Application Serial No. 201880027054.3, Office Action dated Sep. 27, 2021, 10 pages.

The State Intellectual Property Office of the People's Republic of China Application Serial No. 201880027054.3, Notice of Allowance dated Mar. 3, 2022, 4 pages.

* cited by examiner

FIG. 1
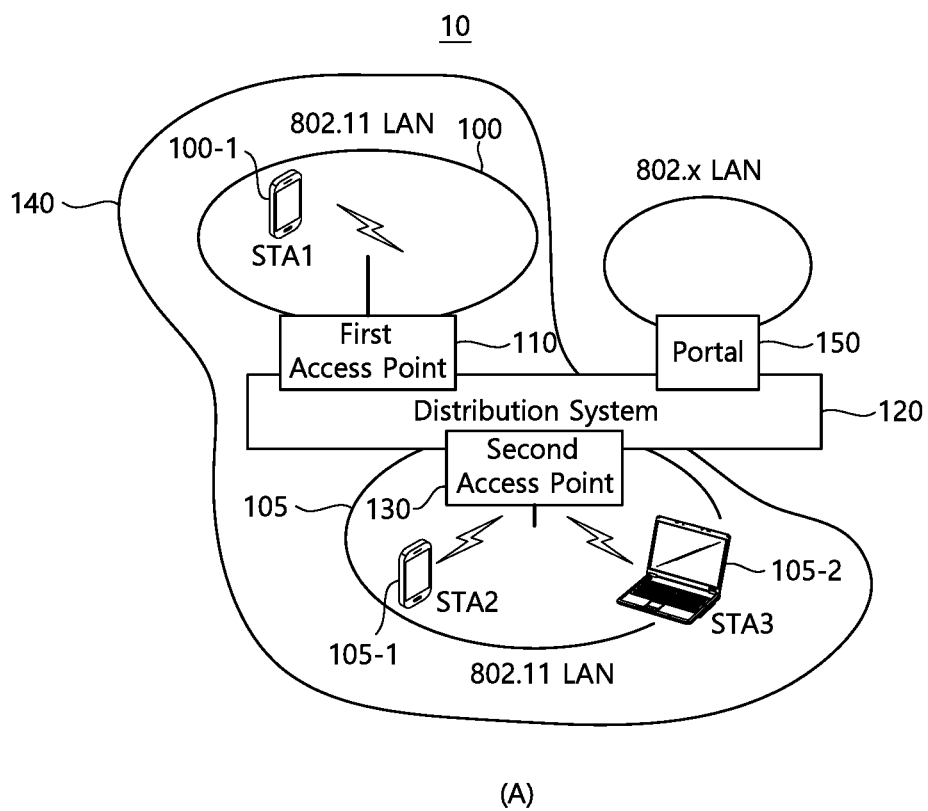
(A)
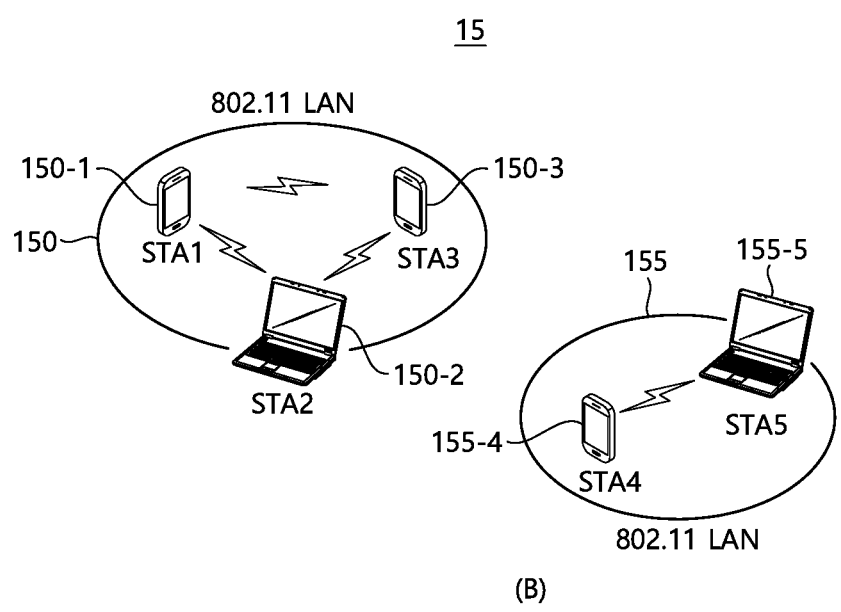
(B)

METHOD FOR RECEIVING FRAME IN WIRELESS LAN SYSTEM, AND WIRELESS TERMINAL USING SAME

CROSS-REFERENCE TO RELATED APPLICATIONS

This application is the National Stage filing under 35 U.S.C. 371 of International Application No. PCT/KR2018/004891, filed on Apr. 27, 2018, which claims the benefit of U.S. Provisional Application No. 62/491,222, filed on Apr. 27, 2017, the contents of which are all hereby incorporated by reference herein in their entirety.

BACKGROUND

Field

The present specification relates to wireless communication, and more particularly, to a method of receiving a frame in a wireless local area network (WLAN) system and a wireless terminal using the same.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present specification provides a method of changing a transmission rate for a packet in a WLAN system and a wireless terminal using the same.

In an aspect, a method of receiving a frame in a WLAN system performed by a first wireless terminal including a main radio module and a wake-up radio (WUR) module includes transmitting a WUR parameter request frame including capability information of the first wireless terminal related to a low power mode in which the main radio module is in an inactive state and the WUR module is in a turn-on state to a second wireless terminal; receiving a WUR parameter response frame including operation information approved by the second wireless terminal based on the capability information from the second wireless terminal, wherein the operation information includes time information for a WUR beacon frame to be transmitted by the second wireless terminal; transmitting a WUR mode request frame to the second wireless terminal in order to enter a low power mode after receiving a WUR parameter response frame; and operating in the low power mode based on the operation information when an acknowledgment (ACK) frame for the WUR mode request frame is received from the second wireless terminal, wherein the WUR beacon frame is received in the WUR module based on the time information, and the WUR beacon frame includes control information for enabling the first wireless terminal to maintain synchronization with the second wireless terminal in the low power mode, and the control information is modulated based on an on-off keying (OOK) technique for the WUR module.

According to an embodiment of the present specification, a method of changing a transmission rate for a packet in a WLAN system and a wireless terminal using the same are provided.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
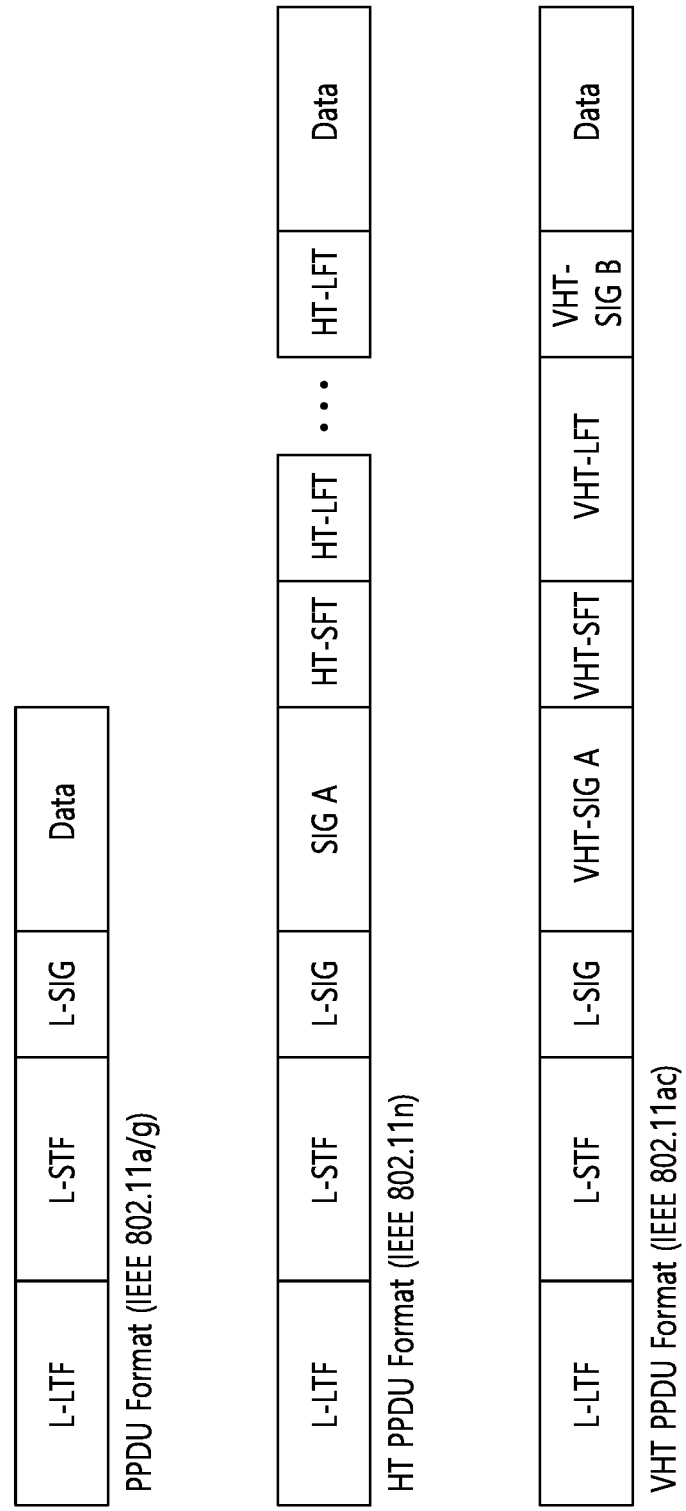
FIG. 2 is a diagram illustrating an example of a PPDU used in an IEEE standard.

The above-described features and the following detailed description are exemplary contents for helping a description and understanding of the present specification. That is, the present specification is not limited to this embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

FIG. 1 is a conceptual diagram illustrating a structure of a WLAN system. FIG. 1(A) illustrates a structure of an infrastructure network of institute of electrical and electronic engineers (IEEE) 802.11.

Referring to FIG. 1(A), a WLAN system 10 of FIG. 1(A) may include at least one basic service set (hereinafter, referred to as 'BSS') 100 and 105. The BSS is a set of access points (hereinafter, APs) and stations (hereinafter, STAs) that can successfully synchronize and communicate with each other and is not a concept indicating a specific area.

For example, a first BSS 100 may include a first AP 110 and one first STA 100-1. A second BSS 105 may include a second AP 130 and one or more STAs 105-1 and 105-2.

The infrastructure BSSs 100 and 105 may include at least one STA, APs 110 and 130 for providing a distribution service, and a distribution system (DS) 120 for connecting a plurality of APs.

The DS 120 may connect a plurality of BSSs 100 and 105 to implement an extended service set (hereinafter, 'ESS') 140. The ESS 140 may be used as a term indicating one network to which at least one AP 110 and 130 is connected through the DS 120. At least one AP included in one ESS 140 may have the same service set identification (hereinafter, SSID).

A portal 150 may serve as a bridge for connecting a WLAN network (IEEE 802.11) with another network (e.g., 802.X).

In a WLAN having a structure as illustrated in FIG. 1(A), a network between the APs 110 and 130 and a network between APs 110 and 130 and STAs 100-1, 105-1, and 105-2 may be implemented.

FIG. 1(B) is a conceptual diagram illustrating an independent BSS. Referring to FIG. 1(B), a WLAN system 15 of FIG. 1(B) may perform communication by setting a network between STAs without the APs 110 and 130, unlike FIG. 1(A). A network that performs communication by setting a network even between STAs without the APs 110 and 130 is defined to an ad-hoc network or an independent basic service set (hereinafter, 'BSS').

Referring to FIG. 1(B), an IBSS 15 is a BSS operating in an ad-hoc mode. Because the IBSS does not include an AP, there is no centralized management entity. Therefore, in the IBSS 15, STAs 150-1, 150-2, 150-3, 155-4, and 155-5 are managed in a distributed manner.

All STAs 150-1, 150-2, 150-3, 155-4, and 155-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the Institute of Electrical and Electronics Engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 µs).

The PPDU used in the IEEE standard is mainly described as a PPDU structure transmitted with a channel bandwidth of 20 MHz. The PPDU structure transmitted with a bandwidth (e.g., 40 MHz and 80 MHz) wider than the channel bandwidth of 20 MHz may be a structure in which linear scaling is applied to the PPDU structure used in the channel bandwidth of 20 MHz.

The PPDU structure used in the IEEE standard may be generated based on 64 Fast Fourier Transforms (FTFs), and a cyclic prefix portion (CP portion) may be ¼. In this case, a length of an effective symbol interval (or FFT interval) may be 3.2 us, a CP length may be 0.8 us, and symbol duration may be 4 us (3.2 us+0.8 us) that adds the effective symbol interval and the CP length.

Figure 4:
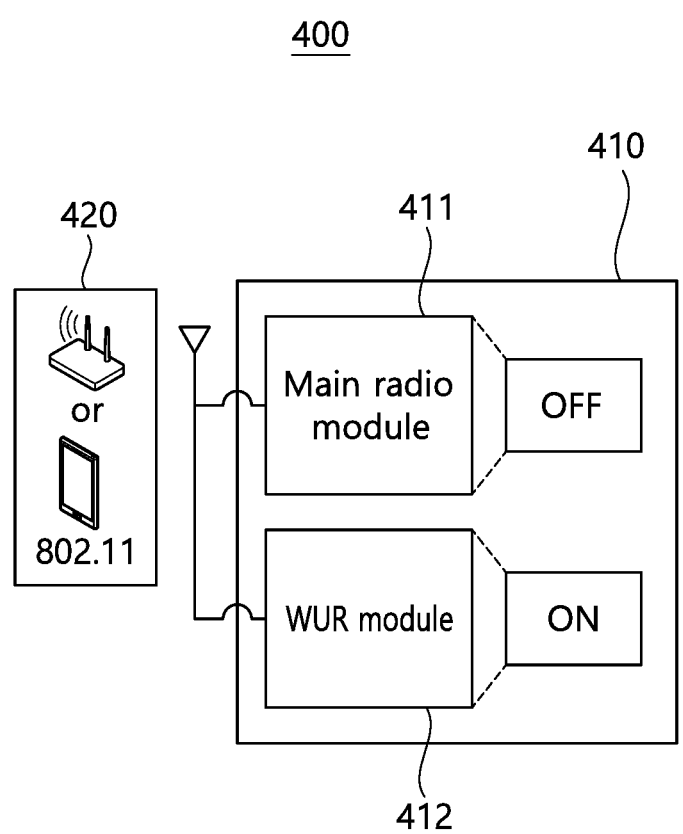
FIG. 4 is an internal block diagram of a wireless terminal receiving a wake-up packet.

FIG. 4 is an internal block diagram of a wireless terminal receiving a wake-up packet.

Referring to FIG. 4, a WLAN system 400 according to the present embodiment may include a first wireless terminal 410 and a second wireless terminal 420.

The first wireless terminal 410 may include a main radio module 411 related to main radio (i.e., 802.11) and a module 412 (hereinafter, WUR module) including a low-power wake-up receiver ('LP WUR'). The main radio module 411 may transmit or receive user data in an active state (i.e., ON state).

When there is no data (or packet) to be transmitted by the main radio module 411, the first radio terminal 410 may control the main radio module 411 to enter an inactive state (i.e., OFF state). For example, the main radio module 411 may include a plurality of circuits supporting Wi-Fi, Bluetooth® radio (hereinafter, BT radio), and Bluetooth® Low Energy radio (hereinafter, BLE radio).

In the related art, a wireless terminal operating based on a power save mode may operate in an active state or a sleep state.

For example, a wireless terminal in an active state may receive all frames from another wireless terminal. Further, a wireless terminal in a sleep state may receive a specific type of frame (e.g., a beacon frame transmitted periodically) transmitted by another wireless terminal (e.g., AP).

It is assumed that a wireless terminal described in the present specification may operate a main radio module in an active state or in an inactive state.

A wireless terminal including a main radio module 411 in an inactive state (i.e., OFF state) may not receive a frame (e.g., 802.11 type PPDU) transmitted by another wireless terminal (e.g., AP) until the main radio module is woken up by the WUR module 412.

For example, a wireless terminal including the main radio module 411 in an inactive state (i.e., OFF state) may not receive a beacon frame periodically transmitted by the AP.

That is, it may be understood that a wireless terminal including a main radio module (e.g., 411) in an inactive state (i.e., OFF state) according to the present embodiment is in a deep sleep state.

Further, a wireless terminal including the main radio module 411 in an active state (i.e., ON state) may receive a frame (e.g., 802.11 type PPDU) transmitted by another wireless terminal (e.g., AP).

Further, it is assumed that a wireless terminal described in the present specification may operate the WUR module in a turn-off state or in a turn-on state.

A wireless terminal including the WUR module 412 in a turn-on state may receive only a specific type of frame transmitted by other wireless terminals. In this case, the specific type of frame may be understood as a frame modulated by an on-off keying (OOK) modulation scheme to be described later with reference to FIG. 5.

A wireless terminal including the WUR module 412 in a turn-off state may not receive a specific type of frame transmitted by other wireless terminals.

In the present specification, in order to represent an ON state of a specific module included in the wireless terminal, terms of an active state and a turn-on state may be used interchangeably. In the same context, in order to represent an OFF state of a particular module included in the wireless terminal, terms of an inactive state and a turn-off state may be used interchangeably.

The wireless terminal according to the present embodiment may receive a frame (or packet) from another wireless terminal based on the main radio module 411 or the WUR module 412 in an active state.

The WUR module 412 may be a receiver for waking the main radio module 411. That is, the WUR module 412 may not include a transmitter. The WUR module 412 may maintain a turn-on state for duration in which the main radio module 411 is in an inactive state.

For example, when a wake-up packet (hereinafter, WUP) for the main radio module 411 is received, the first radio terminal 410 may control the main radio module 411 in an inactive state to enter an active state.

The low-power wake-up receiver (LP WUR) included in the WUR module 412 targets target power consumption of less than 1 mW in an active state. Further, the low-power wake-up receiver may use a narrow bandwidth of less than 5 MHz.

Further, power consumption by the low-power wake-up receiver may be less than 1 Mw. Further, a target transmission range of the low-power wake-up receiver may be the same as that of existing 802.11.

The second wireless terminal 420 according to the present embodiment may transmit user data based on main radio (i.e., 802.11). The second wireless terminal 420 may transmit a wake-up packet (WUP) for the WUR module 412.

Referring to FIG. 4, the second wireless terminal 420 may not transmit user data or a wake-up packet (WUP) for the first wireless terminal 410. In this case, the main radio module 411 included in the second wireless terminal 420 may be in an inactive state (i.e., OFF state), and the WUR module 412 may be in a turn-on state (i.e., ON state).

Figure 5:
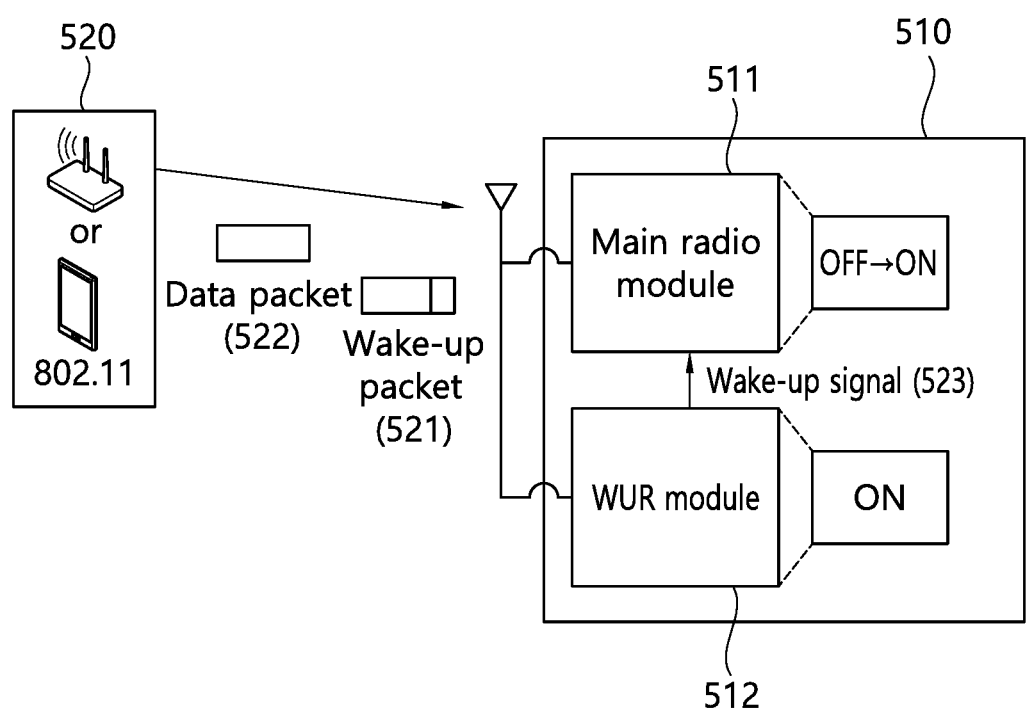
FIG. 5 is a conceptual diagram illustrating a method in which a wireless terminal receives a wake-up packet and a data packet.

FIG. 5 is a conceptual diagram illustrating a method in which a wireless terminal receives a wake-up packet and a data packet.

Referring to FIGS. 4 and 5, a WLAN system 500 according to the present embodiment may include a first wireless terminal 510 corresponding to a receiving terminal and a second wireless terminal 520 corresponding to a transmitting terminal. A basic operation of the first wireless terminal 510 of FIG. 5 may be understood through a description of the first wireless terminal 410 of FIG. 4. Similarly, a basic operation of the second wireless terminal 520 of FIG. 5 may be understood through a description of the second wireless terminal 420 of FIG. 4.

Referring to FIG. 5, when a wake-up packet 521 is received in a WUR module 512 in an active state, the WUR module 512 may transfer a wake-up signal 523 to a main radio module 511 so that the main radio module 511 may accurately receive a data packet 522 to be received after the wake-up packet 521.

For example, the wake-up signal 523 may be implemented based on primitive information inside the first wireless terminal 510.

For example, when the main radio module 511 receives the wake-up signal 523, the main radio module 511 may activate all or only a part of a plurality of circuits (not illustrated) supporting Wi-Fi, BT radio, and BLE radio included therein.

As another example, actual data included in the wake-up packet 521 may be directly transferred to a memory block (not illustrated) of the receiving terminal even if the main radio module 511 is in an inactive state.

As another example, when the wake-up packet 521 includes an IEEE 802.11 MAC frame, the receiving terminal may activate only a MAC processor of the main radio module 511. That is, the receiving terminal may maintain a PHY module of the main radio module 511 in an inactive state. The wake-up packet 521 of FIG. 5 will be described in more detail with reference to the following drawings.

The second wireless terminal 520 may be set to transmit the wake-up packet 521 to the first wireless terminal 510. For example, the second wireless terminal 520 may control the main radio module 511 of the first wireless terminal 510 to enter an active state (i.e., ON state) according to the wake-up packet 521.

Figure 6:
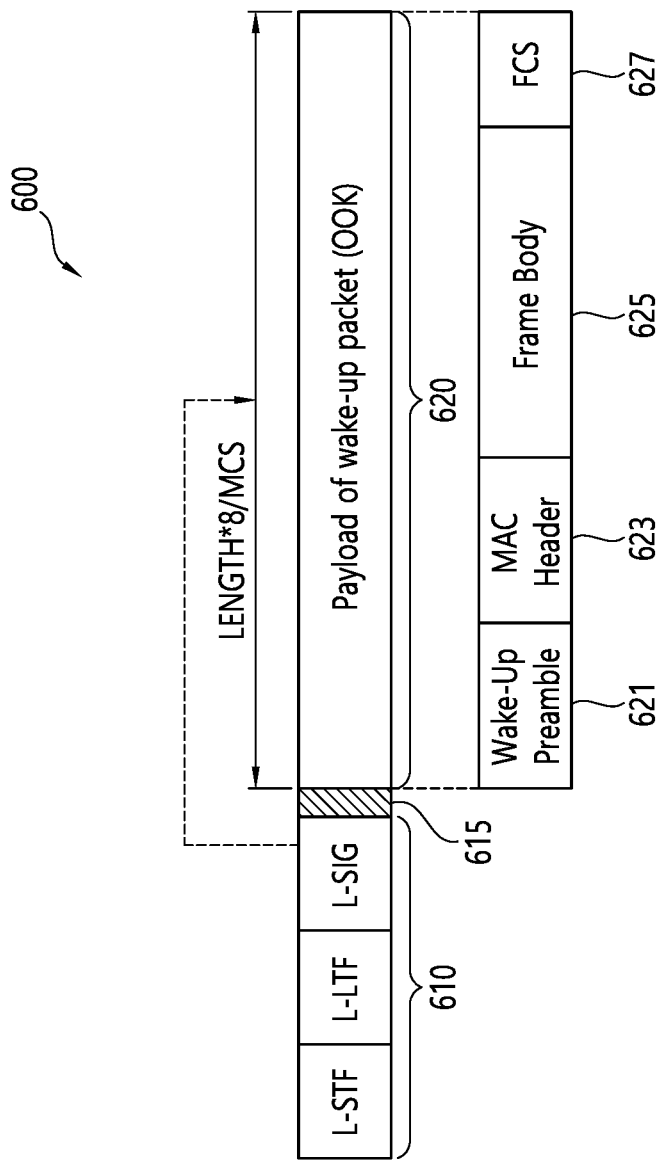
FIG. 6 illustrates an example of a format of a wake-up packet.

FIG. 6 illustrates an example of a format of a wake-up packet.

Referring to FIGS. 1 to 6, a wake-up packet 600 may include one or more legacy preambles 610. Further, the wake-up packet 600 may include a payload 620 after the legacy preamble 610. The payload 620 may be modulated by a simple modulation scheme (e.g., On-Off Keying (OOK) modulation scheme). The wake-up packet 600 including a payload may be transmitted based on a relatively small bandwidth.

Referring to FIGS. 1 to 6, a second wireless terminal (e.g., 520) may be configured to generate and/or transmit wake-up packets 521 and 600. The first wireless terminal (e.g., 510) may be configured to process the received wake-up packet 521.

For example, the wake-up packet 600 may include a legacy preamble 610 or any other preamble (not illustrated) defined in the existing IEEE 802.11 standard. The wake-up packet 600 may include one packet symbol 615 after the legacy preamble 610. Further, the wake-up packet 600 may include a payload 620.

The legacy preamble 610 may be provided for coexistence with a legacy STA. In the legacy preamble 610 for coexistence, an L-SIG field for protecting a packet may be used.

For example, the 802.11 STA may detect a start portion of a packet through an L-STF field in the legacy preamble 610. The STA may detect an end portion of the 802.11 packet through the L-SIG field in the legacy preamble 610.

In order to reduce false alarm of an 802.11n terminal, a modulated symbol 615 may be added after the L-SIG of FIG. 6. One symbol 615 may be modulated according to a BiPhase Shift Keying (BPS K) technique. One symbol 615 may have a length of 4 us. One symbol 615 may have a bandwidth of 20 MHz, as in a legacy part.

The legacy preamble 610 may be understood as a field for a third party legacy STA (STA that does not include the LP-WUR). In other words, the legacy preamble 610 may not be decoded by the LP-WUR.

The payload 620 may include a wake-up preamble field 621, a MAC header field 623, a frame body field 625, and a frame check sequence (FCS) field 627.

The wake-up preamble field 621 may include a sequence for identifying the wake-up packet 600. For example, the wake-up preamble field 621 may include a pseudo random noise (PN) sequence.

The MAC header field 623 may include address information (or an identifier of a receiving device) indicating a receiving terminal for receiving the wake-up packet 600. The frame body field 625 may include other information of the wake-up packet 600.

The frame body 625 may include length information or size information of a payload. Referring to FIG. 6, the length information of the payload may be calculated based on LENGTH information and MCS information included in the legacy preamble 610.

The FCS field 627 may include a Cyclic Redundancy Check (CRC) value for error correction. For example, the FCS field 627 may include a CRC-8 value or a CRC-16 value for the MAC header field 623 and the frame body 625.

Figure 7:
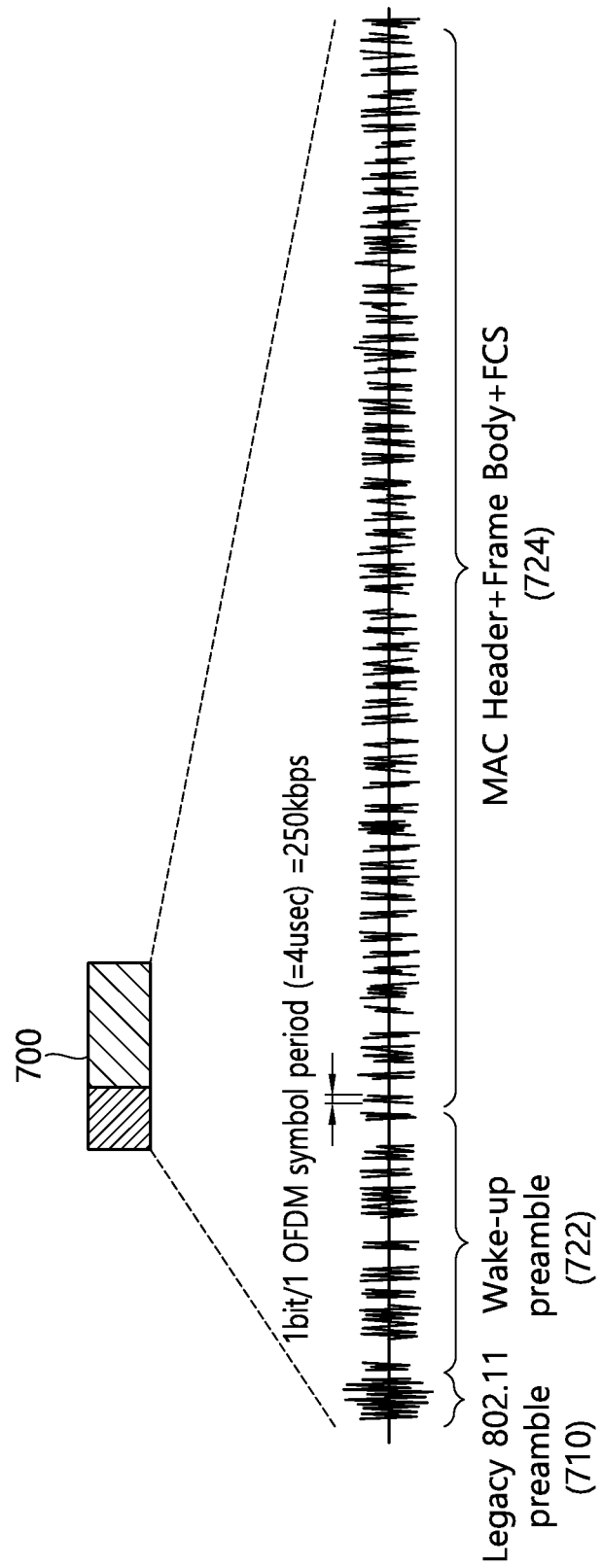
FIG. 7 illustrates a signal waveform of a wake-up packet.

FIG. 7 illustrates a signal waveform of a wake-up packet.

Referring to FIG. 7, a wake-up packet 700 may include a legacy preamble (802.11 preamble) 710 and payloads 722 and 724 modulated based on an On-Off Keying (OOK) technique. That is, the wake-up packet WUP according to the present embodiment may be understood in a form in which a legacy preamble and a new LP-WUR signal waveform coexist.

An OOK technique may not be applied to the legacy preamble 710 of FIG. 7. As described above, the payloads 722 and 724 may be modulated according to the OOK technique. However, the wake-up preamble 722 included in the payloads 722 and 724 may be modulated according to another modulation technique.

For example, it may be assumed that the legacy preamble 710 is transmitted based on a channel band of 20 MHz to which 64 FFTs are applied. In this case, the payloads 722 and 724 may be transmitted based on a channel band of about 4.06 MHz.

Figure 8:
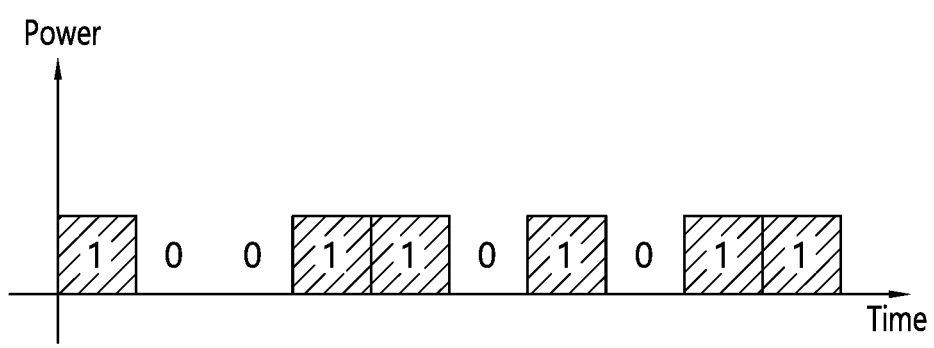
FIG. 8 is a diagram illustrating a procedure of determining power consumption according to a ratio of a bit value constituting information of a binary sequence form.

FIG. 8 is a diagram illustrating a procedure of determining power consumption according to a ratio of bit values constituting information of a binary sequence form.

Referring to FIG. 8, information of a binary sequence form having '1' or '0' as a bit value may be represented. Communication according to an OOK modulation scheme may be performed based on bit values of information of a binary sequence form.

For example, when a light emitting diode is used for visible light communication, if a bit value constituting information of a binary sequence form is '1', the light emitting diode may be turned on, and if a bit value constituting information of a binary sequence form is '0', the light emitting diode may be turned off.

As the light emitting diode blinks, the receiver receives and restores data transmitted in the form of visible light, thereby enabling communication using visible light. However, because blinking of the light emitting diode may not be recognized by the human eye, the person feels that lighting is continuously maintained.

For convenience of description, as illustrated in FIG. 8, information of a binary sequence form having 10 bit values may be provided. For example, information of a binary sequence form having a value of '1001101011' may be provided.

As described above, when the bit value is '1', if the transmitting terminal is turned on and when the bit value is '0', if the transmitting terminal is turned off, symbols corresponding to 6 bit values of the above 10 bit values are turned on.

Because the wake-up receiver WUR according to the present embodiment is included in the receiving terminal, transmission power of the transmitting terminal may not be greatly considered. The reason why an OOK technique is used in the present embodiment is because power consumption in a decoding procedure of a received signal is very small.

Until a decoding procedure is performed, there may be no significant difference between power consumed by the main radio and power consumed by the WUR. However, as a decoding procedure is performed by the receiving terminal, a large difference may occur between power consumed by the main radio module and power consumed by the WUR module. The following description is approximate power consumption.

Existing Wi-Fi power consumption is about 100 mW. Specifically, power consumption of Resonator+Oscillator+PLL (1500 uW)→LPF (300 uW)→ADC (63 uW)→decoding processing (Orthogonal frequency-division multiplexing (OFDM) receiver) (100 mW) may occur.

However, WUR power consumption is about 1 mW. Specifically, power consumption of Resonator+Oscillator (600 uW)→LPF (300 uW)→ADC (20 uW)→decoding processing (Envelope detector) (1 uW) may occur.

Figure 9:
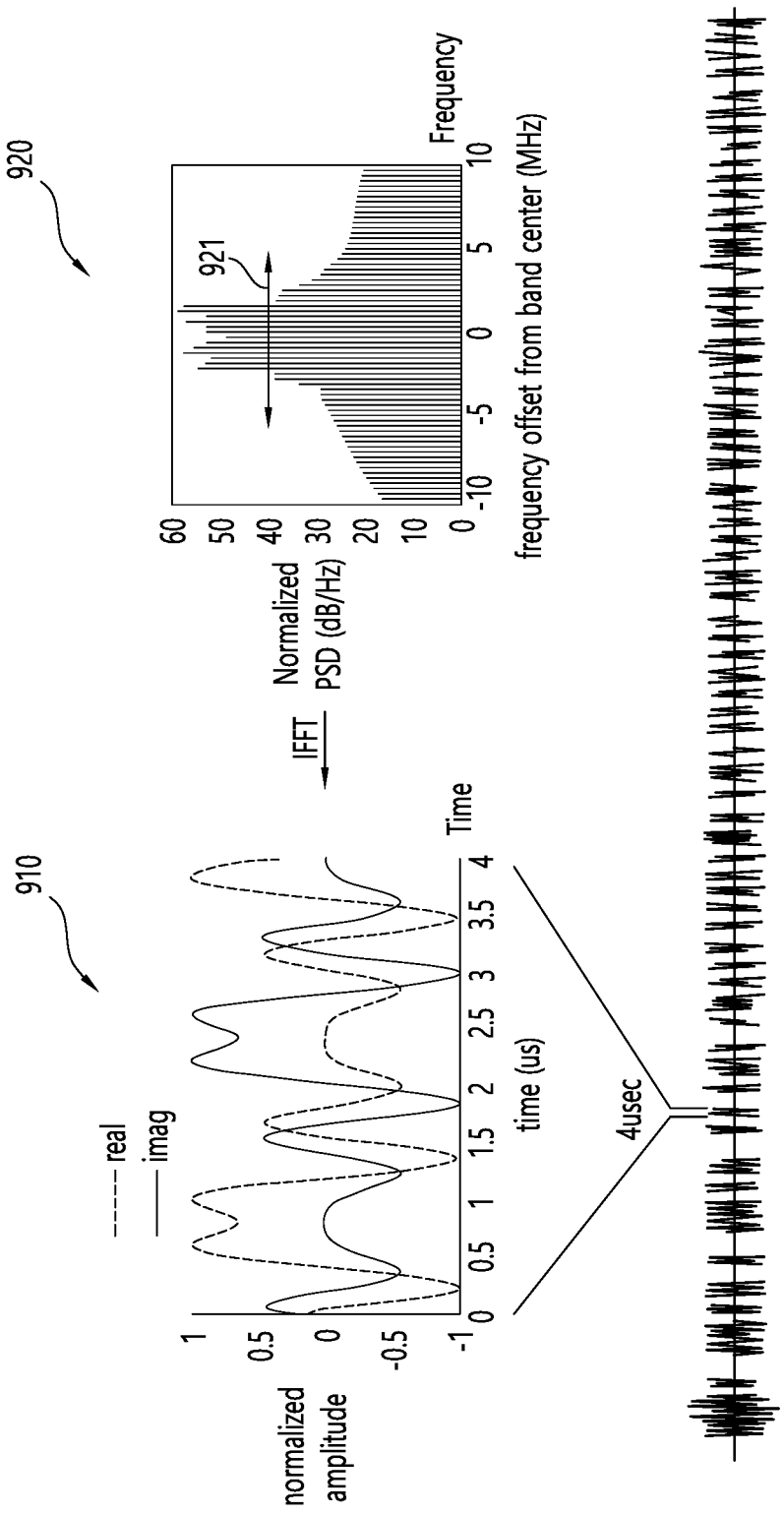
FIG. 9 is a diagram illustrating a design process of a pulse according to an OOK technique.

FIG. 9 is a diagram illustrating a design process of a pulse according to an OOK technique.

A wireless terminal according to the present embodiment may use an existing orthogonal frequency-division multiplexing (OFDM) transmitter of 802.11 in order to generate pulses according to an OOK technique. The existing 802.11 OFDM transmitter may generate a 64-bit sequence by applying 64-point IFFT.

Referring to FIGS. 1 to 9, the wireless terminal according to the present embodiment may transmit a payload of a modulated wake-up packet (WUP) according to an OOK technique. The payload (e.g., 620 of FIG. 6) according to the present embodiment may be implemented based on an ON-signal and an OFF-signal.

The OOK technique may be applied for the ON-signal included in the payload (e.g., 620 of FIG. 6) of the WUP. In this case, the ON-signal may be a signal having an actual power value.

With reference to a frequency domain graph 920, an ON-signal included in the payload (e.g., 620 of FIG. 6) may be obtained by performing IFFT for the N2 number of subcarriers (N2 is a natural number) among the N1 number of subcarriers (N1 is a natural number) corresponding to a channel band of the WUP. Further, a predetermined sequence may be applied to the N2 number of subcarriers.

For example, a channel band of the WUP may be 20 MHz. The N1 number of subcarriers may be 64 subcarriers, and the N2 number of subcarriers may be consecutive 13 subcarriers (921 of FIG. 9). A subcarrier interval applied to the wake-up packet (WUP) may be 312.5 kHz.

The OOK technique may be applied for an OFF-signal included in the payload (e.g., 620 of FIG. 6) of the WUP. The OFF-signal may be a signal that does not have an actual power value. That is, the OFF-signal may not be considered in a configuration of the WUP.

The ON-signal included in the payload (620 of FIG. 6) of the WUP may be determined (i.e., demodulated) to a 1-bit ON-signal (i.e., '1') by the WUR module (e.g., 512 of FIG. 5). Similarly, the OFF-signal included in the payload may be determined (i.e., demodulated) to a 1-bit OFF-signal (i.e., '0') by the WUR module (e.g., 512 of FIG. 5).

A specific sequence may be preset for a subcarrier set 921 of FIG. 9. In this case, the preset sequence may be a 13-bit sequence. For example, a coefficient corresponding to the DC subcarrier in the 13-bit sequence may be '0', and the remaining coefficients may be set to '1' or '−1'.

With reference to the frequency domain graph 920, the subcarrier set 921 may correspond to a subcarrier whose subcarrier indices are '−6' to '+6'.

For example, a coefficient corresponding to a subcarrier whose subcarrier indices are '−6' to '−1' in the 13-bit sequence may be set to '1' or '−1'. A coefficient corresponding to a subcarrier whose subcarrier indices are '1' to '6' in the 13-bit sequence may be set to '1' or '−1'.

For example, a subcarrier whose subcarrier index is '0' in the 13-bit sequence may be nulled. All coefficients of the remaining subcarriers (subcarrier indexes '−32' to '−7' and subcarrier indexes '+7' to '+31'), except for the subcarrier set 921 may be set to '0'.

The subcarrier set 921 corresponding to consecutive 13 subcarriers may be set to have a channel bandwidth of about 4.06 MHz. That is, power by signals may be concentrated at 4.06 MHz in the 20 MHz band for the wake-up packet (WUP).

According to the present embodiment, when a pulse according to the OOK technique is used, power is concentrated in a specific band and thus there is an advantage that a signal to noise ratio (SNR) may increase, and in an AC/DC converter of the receiver, there is an advantage that power consumption for conversion may be reduced. Because a sampling frequency band is reduced to 4.06 MHz, power consumption by the wireless terminal may be reduced.

An OFDM transmitter of 802.11 according to the present embodiment may have may perform IFFT (e.g., 64-point IFFT) for the N2 number (e.g., consecutive 13) of subcarriers of the N1 number (e.g., 64) of subcarriers corresponding to a channel band (e.g., 20 MHz band) of a wake-up packet.

In this case, a predetermined sequence may be applied to the N2 number of subcarriers. Accordingly, one ON-signal may be generated in a time domain One bit information corresponding to one ON-signal may be transferred through one symbol.

For example, when a 64-point IFFT is performed, a symbol having a length of 3.2 us corresponding to a subcarrier set 921 may be generated. Further, when a cyclic prefix (CP, 0.8 us) is added to a symbol having a length of 3.2 us corresponding to the subcarrier set 921, one symbol having a total length of 4 us may be generated, as in the time domain graph 910 of FIG. 9.

Further, the OFDM transmitter of 802.11 may not transmit an OFF-signal.

According to the present embodiment, a first wireless terminal (e.g., 510 of FIG. 5) including a WUR module (e.g., 512 of FIG. 5) may demodulate a receiving packet based on an envelope detector that extracts an envelope of a received signal.

For example, the WUR module (e.g., 512 of FIG. 5) according to the present embodiment may compare a power level of a received signal obtained through an envelope of the received signal with a predetermined threshold level.

If a power level of the received signal is higher than a threshold level, the WUR module (e.g., 512 of FIG. 5) may determine the received signal to a 1-bit ON-signal (i.e., '1'). If a power level of the received signal is lower than a threshold level, the WUR module (e.g., 512 of FIG. 5) may determine the received signal to a 1-bit OFF-signal (i.e., '0').

Generalizing contents of FIG. 9, each signal having a length of K (e.g., K is a natural number) in the 20 MHz band may be transmitted based on consecutive K subcarriers of 64 subcarriers for the 20 MHz band. For example, K may correspond to the number of subcarriers used for transmitting a signal. Further, K may correspond to a bandwidth of a pulse according to the OOK technique.

All coefficients of the remaining subcarriers, except for K subcarriers among 64 subcarriers may be set to '0'.

Specifically, for a one bit OFF-signal corresponding to '0' (hereinafter, information 0) and a one bit ON-signal corresponding to '1' (hereinafter, information 1), the same K subcarriers may be used. For example, the used index for the K subcarriers may be expressed as 33-floor (K/2): 33+ceil (K/2)−1.

In this case, the information 1 and the information 0 may have the following values.

Information 0=zeros (1, K)
Information 1=alpha*ones (1, K)

The alpha is a power normalization factor and may be, for example, 1/sqrt (K).

Hereinafter, for simple and clear understanding in the present specification, when the main radio module (e.g., 511 of FIG. 5, 1311 of FIG. 13) of the wireless terminal (e.g., 510 of FIG. 5) is in an inactive state (i.e., OFF state) and when the WUR module (e.g., 512 of FIG. 5) is in a turn-on state (i.e., ON state), it may be described that the wireless terminal operates in a WUR mode or a low power mode.

According to the present specification, in order for a wireless terminal to operate in a low power mode (or WUR mode) having a predetermined period while maintaining time synchronization with an AP, it is necessary that various information related to a low power mode (or WUR mode) is exchanged with the AP through a predetermined procedure.

Figure 10:
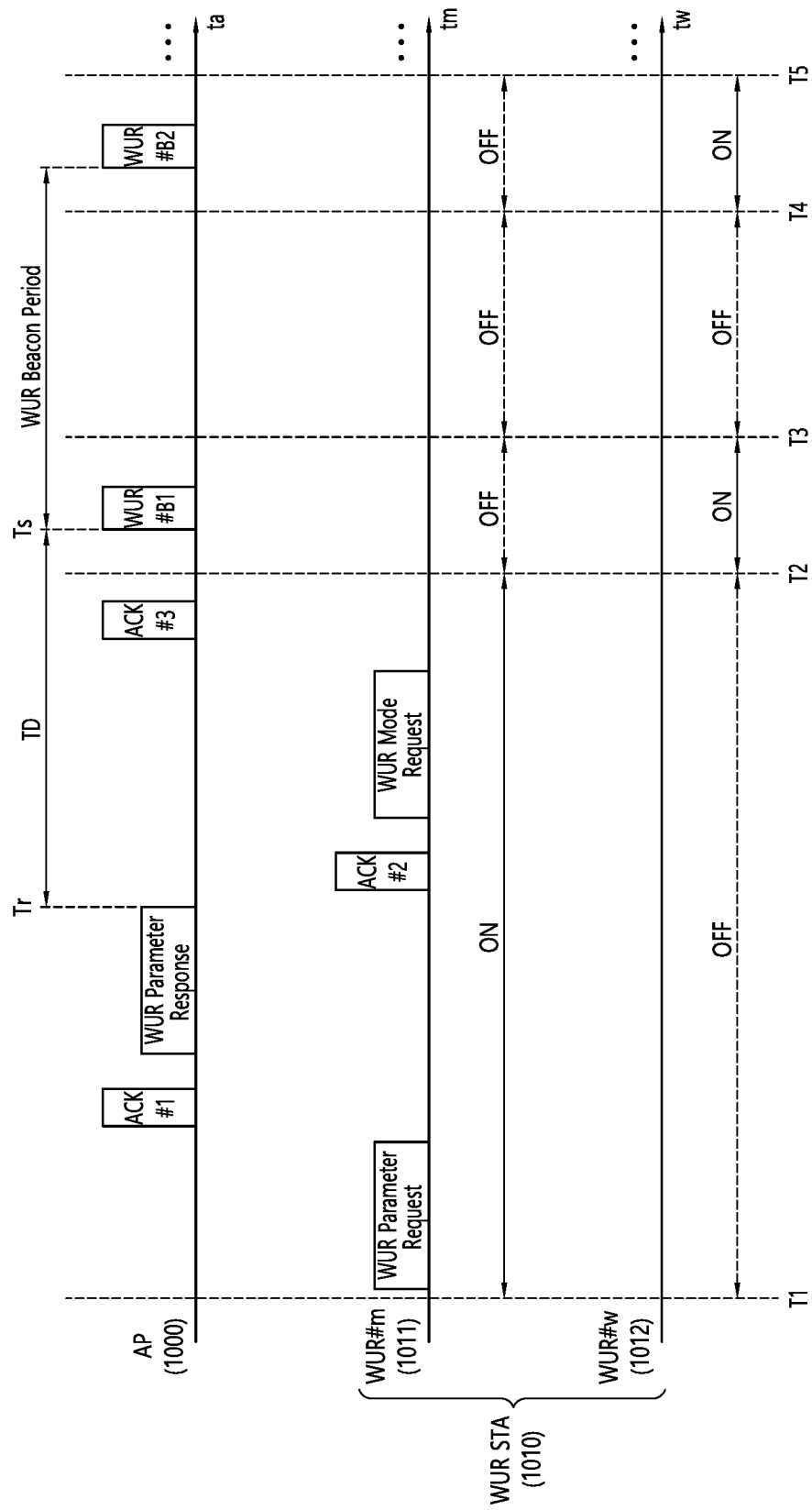
FIG. 10 is a diagram illustrating a method of receiving a frame in a WLAN system according to the present embodiment.

FIG. 10 is a diagram illustrating a method of receiving a frame in a WLAN system according to the present embodiment. A WUR STA 1010 of FIG. 10 may be understood as a wireless terminal associated with an AP 1000 through an association procedure (not illustrated).

Referring to FIGS. 5 and 10, the AP 1000 of FIG. 10 may correspond to the second wireless terminal 520 of FIG. 5. A horizontal axis of the AP 1000 of FIG. 10 may represent a time ta. A vertical axis of the AP 1000 of FIG. 10 may be related to presence of a packet (or frame) to be transmitted by the AP 1000.

The WUR STA 1010 may correspond to the first wireless terminal 510 of FIG. 5. The WUR STA 1010 may include a main radio module WUR #m 1011 and a WUR module WUR #w 1012. The main radio module 1011 of FIG. 10 may correspond to the main radio module 511 of FIG. 5.

Specifically, the main radio module 1011 may support both a reception operation for receiving an 802.11-based packet from the AP 1000 and a transmission operation for transmitting an 802.11-based packet to the AP 1000. For example, the 802.11-based packet may be a packet modulated according to the OFDM technique.

A horizontal axis of the main radio module 1011 may represent a time tm. An arrow displayed at the lower end of the horizontal axis of the main radio module 1011 may be related to a power state (e.g., ON state or OFF state) of the main radio module 1011.

A vertical axis of the main radio module 1011 may be related to presence of a packet to be transmitted based on the main radio module 1011. A WUR module 1012 of FIG. 10 may correspond to the WUR module 512 of FIG. 5. Specifically, the WUR module 1012 may support only a reception operation for a packet modulated from the AP 1000 according to the OOK technique.

A horizontal axis of the WUR module 1012 may represent a time tw. Further, an arrow displayed at the lower end of the horizontal axis of the WUR module 1012 may be related to a power state (e.g., ON state or OFF state) of the WUR module 1012.

The WUR STA 1010 according to the present embodiment may operate in a low power mode for each power saving period (e.g., T2 to T3 and T4 to T5 of FIG. 10) of a predetermined period. When the WUR STA 1010 operates in a low power mode, the main radio module 1011 may be in an inactive state (i.e., OFF state) and the WUR module 1012 may be in a turn-on state (i.e., ON state).

The WUR STA 1010 according to the present embodiment may operate in an extreme low power mode in an extreme power saving period (e.g., T2 to T3 of FIG. 10) between power saving periods. When the WUR STA 1010 operates in an extreme low power mode, the main radio module 1011 may be in an inactive state (i.e., OFF state), and the WUR module 1012 may be in a turn-off state (i.e., OFF state).

In a first period T1 to T2 of FIG. 10, it may be assumed that the main radio module 1011 is in an active state (i.e., ON state) and the WUR module 1012 is in a turn-off state (i.e., OFF state).

The WUR STA 1010 may transmit a WUR parameter request frame to the AP 1000 based on the main radio module 1011 in an active state. For example, the WUR parameter request frame may be a frame modulated according to the OFDM technique.

Further, the WUR parameter request frame may include capability information of the WUR STA 1010 related to a low power mode for the WUR STA 1010. Specific information elements related to capability information of the WUR STA 1010 will be described in more detail later with reference to FIG. 11.

Subsequently, the AP 1000 may transmit a first ACK frame (ACK #1) for notifying successful reception of the WUR parameter request frame to the WUR STA 1010. For example, the ACK #1 may be a frame modulated according to the OFDM scheme for the main radio module 1011.

Subsequently, the AP 1000 may approve (or determine) operation information for a low power mode of the WUR STA 1010 based on capability information of the WUR STA 1010 included in the WUR parameter request frame.

For example, the AP 1000 may approve (or determine) operation information for a low power mode of the WUR STA 1010 according to all or part of the received capability information. Alternatively, the AP 1000 may approve (or determine) operation information for a low power mode of the WUR STA 1010 unlike all or part of the received capability information.

In this case, the AP 1000 may transmit a WUR parameter response frame including operation information approved (or determined) by the AP 1000 to the WUR STA 1010.

For example, the WUR parameter response frame may be a frame modulated according to the OFDM scheme for the main radio module 1011. For example, the operation information may include time information for a WUR beacon frame to be transmitted by the AP 1000.

For example, the time information included in the WUR parameter response frame may be set to an offset value indicating a transmission start time (e.g., Ts) of a first WUR beacon frame (e.g., WUR #B1 of FIG. 10).

Further, an offset value indicating a transmission start time (e.g., Ts) of the first WUR beacon frame (e.g., WUR #B1 of FIG. 10) may be determined based on a timing synchronization function (hereinafter, TSF) timer of the AP 1000. For reference, a more detailed description regarding a TSF timer operation may refer to sections 11.1.2 and 11.1.3 of IEEE Draft P802.11-REVmc™/D8.0 disclosed in August 2016.

As another example, the time information may include may be set to include information on a time difference (e.g., TD) between a reference time point (Tr of FIG. 10) at which a WUR parameter response frame is received and a transmission start time (e.g., Ts) of a first WUR beacon frame (e.g., WUR #B1 of FIG. 10) to be transmitted by the AP 1000.

Further, the operation information may further include information about a reference time (e.g., Tr of FIG. 10) at which the WUR parameter response frame is received, information about an ON-duration time (e.g., T2 to T3 of FIG. 10, T4 to T5 of FIG. 10) of maintaining a low power mode, and information about a transmission period of a WUR beacon frame (e.g., the WUR Beacon Period of FIG. 10).

Subsequently, the WUR STA 1010 may transmit a second ACK frame (ACK #2) for notifying successful reception of the WUR parameter response frame to the AP 1000. For example, the ACK #2 may be a frame modulated according to the OFDM technique.

Subsequently, in order to enter a low power mode (or WUR mode), the WUR STA 1010 may transmit a WUR Mode Request frame to the AP 1000. For example, the WUR mode request frame may be a frame modulated according to the OFDM technique.

Subsequently, the AP 1000 may transmit a third ACK frame (ACK #3) for notifying successful reception of the WUR mode request frame to the WUR STA 1010. For example, the ACK #3 may be a frame modulated according to the OFDM scheme for the main radio module 1011.

When the ACK #3 is received based on the main radio module 1011 of the WUR STA 1010, in the second period T2 to T3 of FIG. 10, the WUR STA 1010 may operate in a low power mode (i.e., WUR mode) based on operation information.

In the second period T2 to T3 of FIG. 10, in order to receive a plurality of WUR beacon frames (e.g., WUR #B1 and WUR #B2 of FIG. 10) to be transmitted by the AP 1000 at a predetermined period (WUR Beacon Period), the WUR STA 1010 according to the present embodiment may operate in a low power mode at regular intervals.

For example, each of the WUR beacon frames (e.g., WUR #B1 and WUR #B2 of FIG. 10) may include time synchronization information for maintaining synchronization with the AP 1000, information for notifying existence of data to be transmitted to each WUR STA associated with the AP, and information for discovery of the WUR STA.

In the second period T2 to T3 of FIG. 10, the WUR STA 1010 according to the present embodiment may receive a first WUR beacon frame (e.g., WUR #B1 of FIG. 10) according to time information included in a WUR parameter response frame.

In this case, the first WUR beacon frame (e.g., WUR #B1 of FIG. 10) may include control information for maintaining synchronization with the AP 1000 by the WUR STA 1010 operating in a low power mode. Further, the control information included in the first WUR beacon frame (e.g., WUR #B1 of FIG. 10) may be modulated according to an on-off keying (OOK) technique for the WUR module 1012.

In other words, in the second period T2 to T3 of FIG. 10, the WUR STA 1010 operating in a low power mode may demodulate the first WUR beacon frame (e.g., WUR #B1 of FIG. 10) based on the WUR module 1012.

In a third period T3 to T4 of FIG. 10, the WUR STA 1010 according to the present embodiment may operate in an extreme low power mode according to the operation information.

For example, in the third period T3 to T4 of FIG. 10, the WUR STA 1010 may not only maintain an inactive state (i.e., OFF state) of the main radio module 1011 but also maintain a turn-off state (i.e., OFF state) of the WUR module 1012.

Accordingly, in the third period T3 to T4 of FIG. 10, the WUR STA 1010 may reduce power consumption further than a low power mode of the second period T2 to T3.

In a fourth period T4 to T5 of FIG. 10, the WUR STA 1010 may again operate in a low power mode (i.e., WUR mode) according to the operation information. Specifically, after receiving the first WUR beacon frame (e.g., WUR #B1 of FIG. 10), the WUR STA 1010 may receive a second WUR beacon frame (e.g., WUR #B2 of FIG. 10) from the AP 1000 according to a predetermined WUR beacon period.

In this case, the second WUR beacon frame (e.g., WUR #B2 of FIG. 10) may include control information for maintaining synchronization with the AP 1000 by the WUR STA 1010 operating in a low power mode. Further, the control information included in the second WUR beacon frame (e.g., WUR #B2 of FIG. 10) may be modulated according to an on-off keying (OOK) technique for the WUR module 1012.

In other words, in the fourth period T4 to T5 of FIG. 10, the WUR STA 1010 operating in a low power mode may demodulate the second WUR beacon frame (e.g., WUR #B2 of FIG. 10) based on the WUR module 1012.

Figure 11:
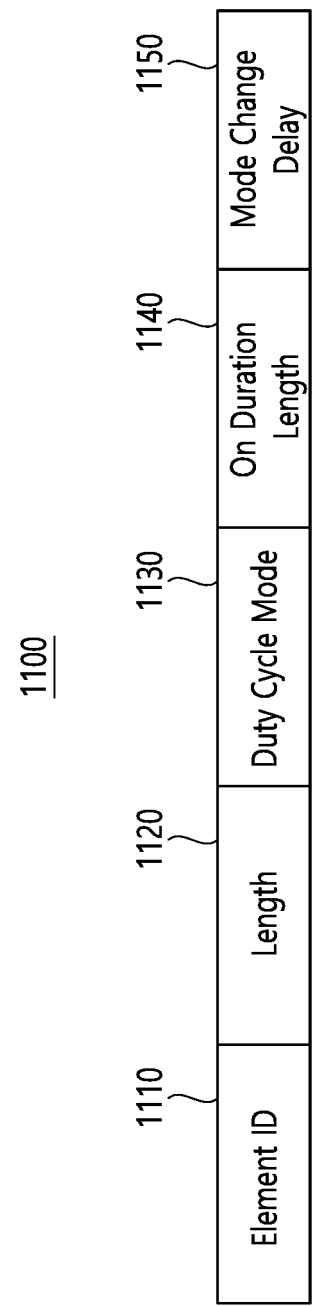
FIG. 11 illustrates a format of an information element included in a WUR parameter request frame according to the present embodiment.

FIG. 11 illustrates a format of an information element included in a WUR parameter request frame according to the present embodiment.

Referring to FIGS. 10 and 11, a WUR duty cycle request information element 1100 may include a plurality of fields 1110 to 1150. In the present specification, information included in the plurality of fields 1110 to 1150 may be referred to as capability information of a WUR STA (e.g., 1010 of FIG. 10).

An element ID field 1110 may include information for indicating the WUR duty cycle request information element 1100 of a plurality of information element information included in the WUR parameter request frame. For example, one octet may be allocated for the element ID field 1110.

A length field 1120 may include information for indicating a length of the WUR duty cycle request information element 1100. For example, one octet may be allocated for the length field 1120.

A duty cycle mode field 1130 may include information for indicating one of FIGS. 13 to 15 to be described later to a duty cycle mode for the WUR STA. For example, one octet may be allocated for the duty cycle mode field 1130.

Alternatively, the duty cycle mode field 1130 may include information about at least one duty cycle mode that may be supported by a WUR STA (e.g., 1010 of FIG. 10) of FIGS. 13 to 15 to be described later.

An on duration length field 1140 may include information indicating a length of a time interval (e.g., T2 to T3 and T4 to T5 of FIG. 10) in which the WUR STA operates in a low power mode in order to receive a WUR beacon frame. For example, one octet may be allocated for the on duration length field 1140.

A mode change delay field 1150 may include information indicating a delay value required for the WUR STA to switch a power state (i.e., ON state, OFF state) of the main radio module 1011 or a delay value required for the WUR STA to switch a power state (i.e., ON state, OFF state) of the WUR module 1011. For example, one octet may be allocated for the mode change delay field 1150.

Figure 12:
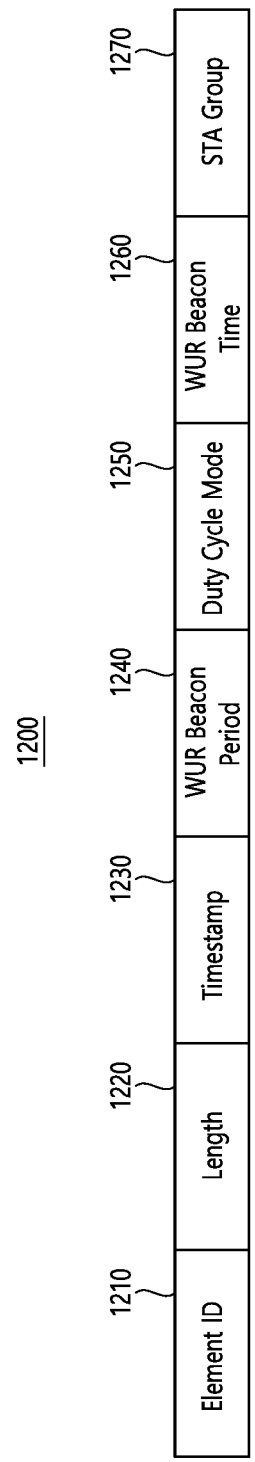
FIG. 12 illustrates a format of an information element included in a WUR parameter response frame according to the present embodiment.

FIG. 12 illustrates a format of an information element included in a WUR parameter response frame according to the present embodiment.

Referring to FIGS. 10 to 12, a WUR duty cycle response information element 1200 may include a plurality of fields 1210 to 1270. In the present specification, information included in the plurality of fields 1210 to 1270 may be referred to as operation information approved (or determined) by the AP 1000.

An element ID field 1210 may include information for indicating the WUR duty cycle response information element 1200 among a plurality of information element information included in the WUR parameter response frame. For example, one octet may be allocated for the element ID field 1210.

A length field 1220 may include information for indicating a length of the WUR duty cycle response information element 1200. For example, one octet may be allocated for the length field 1220.

A timestamp field 1230 may include information about a reference time point (Tr of FIG. 10) at which a WUR parameter response frame is received. For example, one octet may be allocated for the timestamp field 1230.

A WUR beacon period field 1240 may include information about a WUR beacon period of a WUR beacon frame (e.g., WUR #B1 and WUR #B2 of FIG. 10). For example, one octet may be allocated for the WUR beacon period field 1240.

Figure 13:
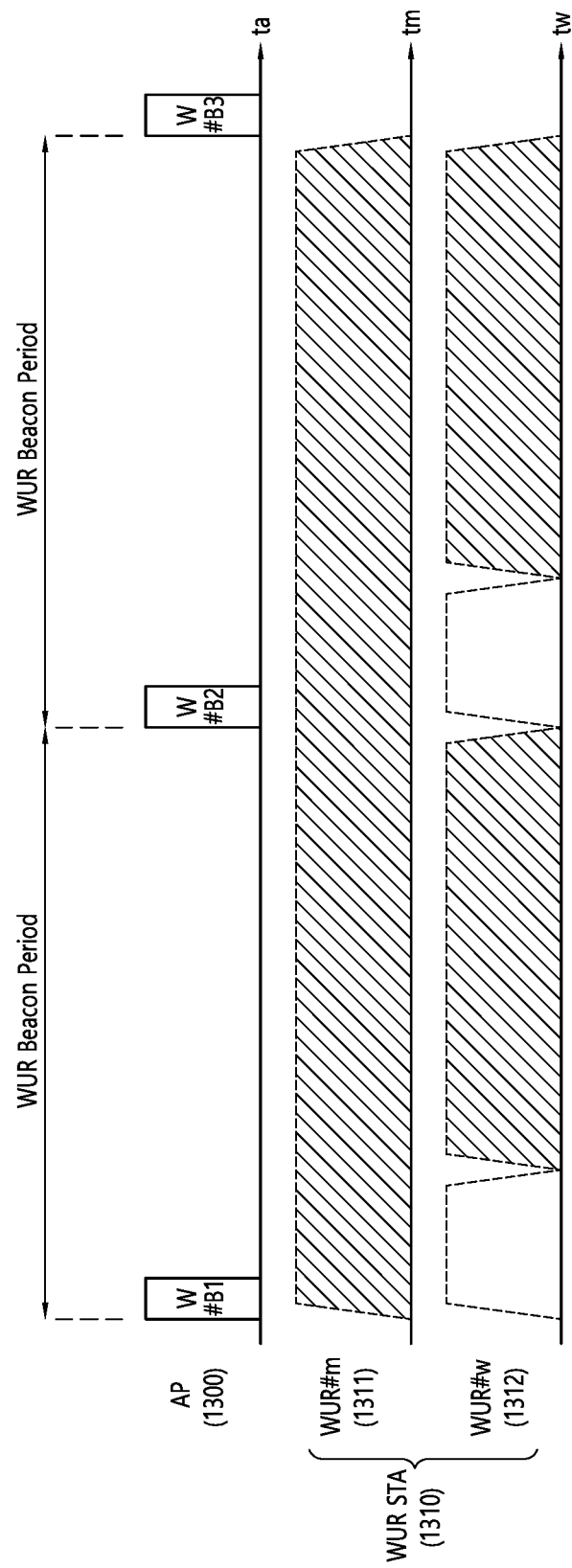
FIGS. 13 to 15 are diagrams illustrating a duty cycle mode of a beacon frame according to the present embodiment.
Figure 14:
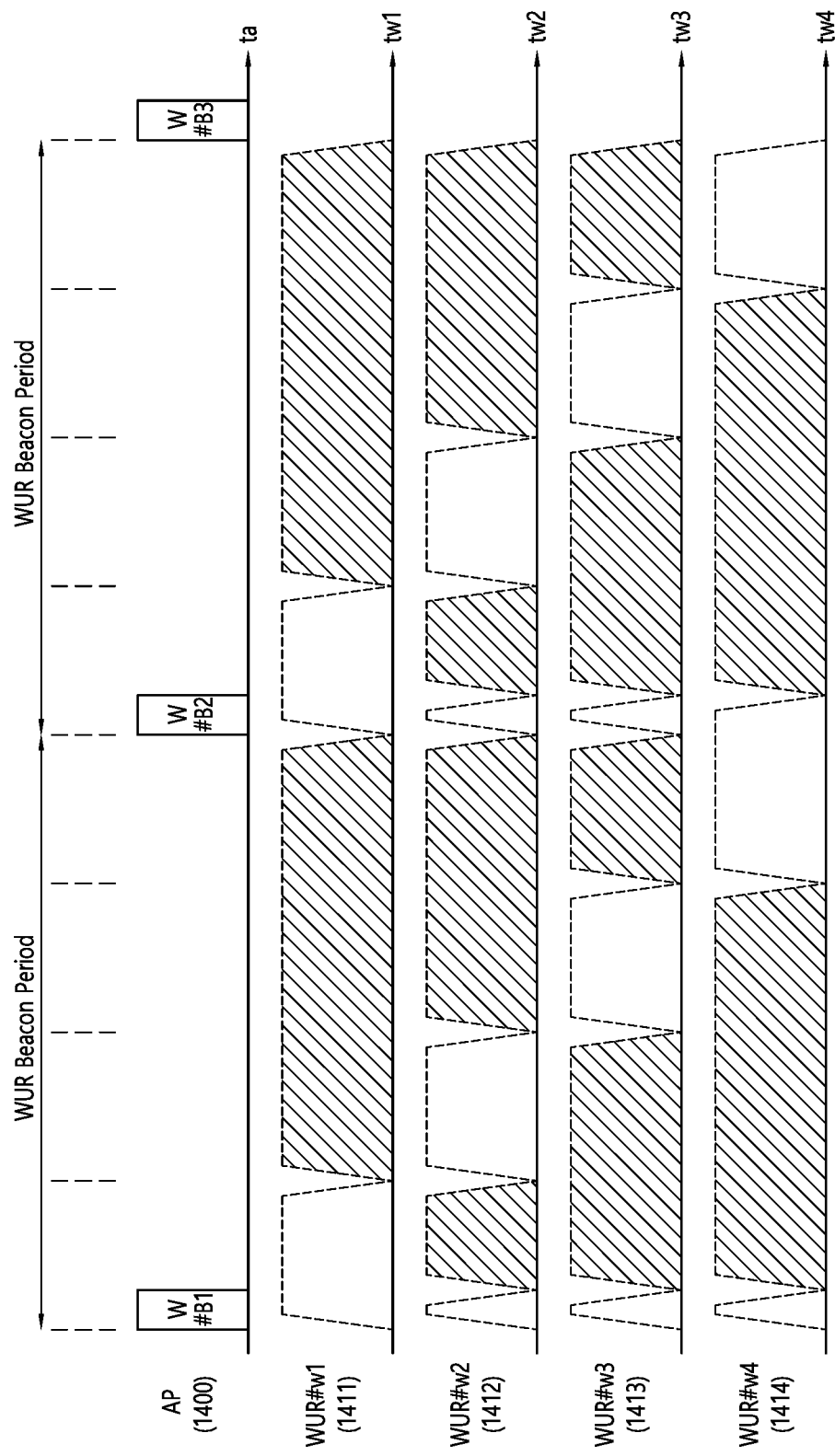
Figure 15:
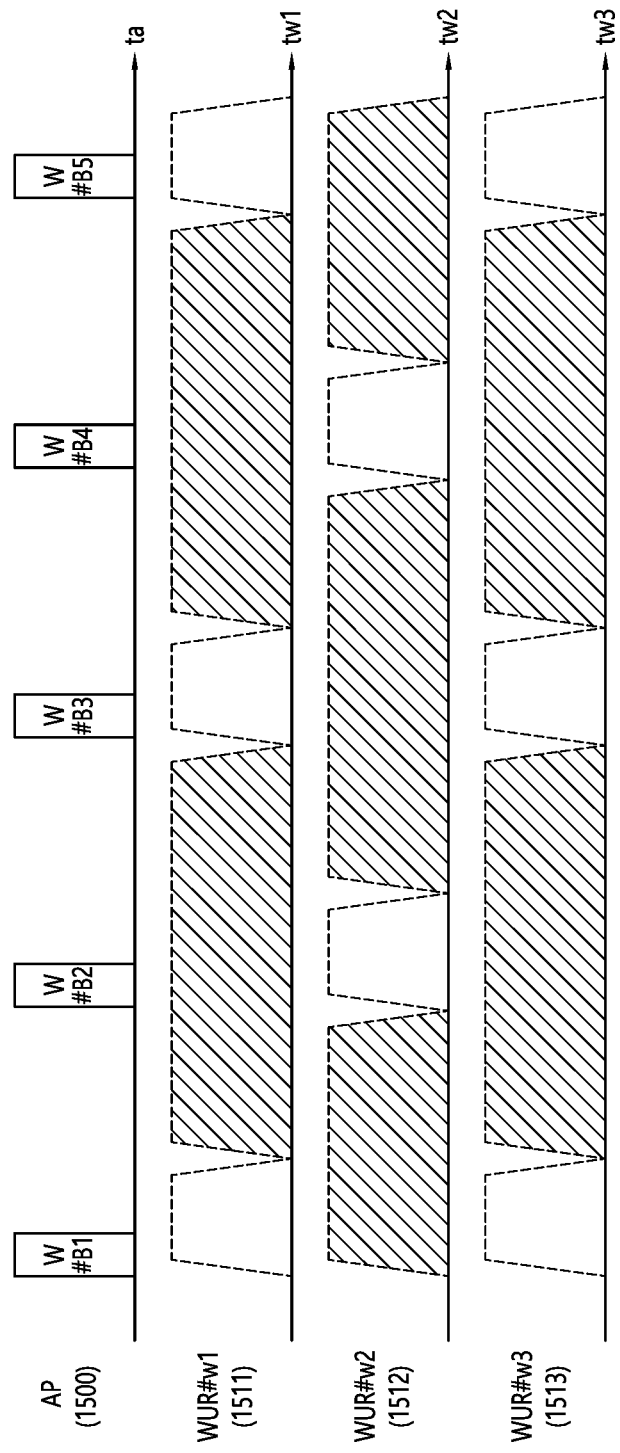

A duty cycle mode field 1250 may include information for notifying any one determined by the AP of FIGS. 13 to 15 in a duty cycle mode for the WUR STA. For example, one octet may be allocated for the duty cycle mode field 1250.

A WUR beacon time field 1260 may include information about a time in which a first WUR beacon frame (e.g., WUR #B1) is transmitted by the AP after transmission of the WUR parameter response frame. For example, one octet may be allocated for the WUR beacon time field 1260.

When the duty cycle mode field 1250 indicates a duty cycle mode of FIG. 13 to be described later, a STA group field 1270 may be used for notifying each WUR STA group whether existence of a downlink data frame.

Further, when the duty cycle mode field 1250 indicates the duty cycle mode of FIG. 14 to be described later, the STA group field 1270 may be used for notifying a time interval in which the WUR STA operates in a low power mode.

Further, when the duty cycle mode field 1250 indicates a duty cycle mode of FIG. 15 to be described later, the STA group field 1270 may be used for notifying a WUR beacon frame in which the WUR STA receives.

FIGS. 13 to 15 are diagrams illustrating a duty cycle mode of a beacon frame according to the present embodiment. Referring to FIGS. 13 to 15, a dotted line on a white background indicates an ON state, and a dotted line on a hatched background indicates an OFF state.

Referring to FIG. 13, an AP 1300 according to the present embodiment may transmit a WUR beacon frame (e.g., W #B1, W #B2, and W #B3 of FIG. 13) for each WUR beacon period.

Further, a WUR STA 1310 may receive a WUR beacon frame (e.g., W #B1, W #B2, and W #B3 of FIG. 13) based on the WUR module 1312 in a turn-on state (ON state). That is, the WUR STA 1310 may switch the WUR module 1312 from a turn-off state to a turn-on state at every predetermined period (i.e., WUR Beacon Period).

In order to receive a wake-up packet (not illustrated, e.g., 521 of FIG. 5) from the AP 1300 after receiving a WUR beacon frame (e.g., W #B1, W #B2, W #B3 of FIG. 13), the WUR STA 1310 may maintain the WUR module 1312 in a turn-on state (ON state) for a predetermined time.

After a predetermined time has elapsed, the WUR STA 1310 may switch a state of the WUR module 1312 to a turn-off state and operate in an extremely low power mode until a WUR beacon frame of a next period is received.

Referring to FIG. 14, each of time intervals in which one WUR beacon period is divided into four equal parts for each of WUR modules 1411, 1412, 1413, and 1414 of each WUR STA may be allocated.

A first WUR STA may maintain the first WUR module 1411 in an on-state in a first quarter of the WUR Beacon period. A second WUR STA may maintain the second WUR module 1412 in an on-state in a second quarter of the WUR Beacon period.

A third WUR STA may maintain the third WUR module 1413 in an on-state in a third quarter of the WUR Beacon period. A fourth WUR STA may maintain the fourth WUR module 1414 in an on-state in a fourth quarter of the WUR Beacon period.

In order to maintain synchronization between each WUR STA and the AP, each WUR STA may receive a WUR beacon frame while maintaining a WUR module thereof to a turn-on state at a transmission time of the WUR beacon frame.

After the WUR beacon frame is received, each WUR STA may maintain the WUR module to a turn-on state only in a quarter of a pre-allocated WUR beacon period and maintain a turn-off state in the remaining periods.

An embodiment of FIG. 14 is an example, and it will be understood that the present specification may be applied by dividing the WUR beacon period into three or five equal parts instead of four equal parts.

Referring to FIG. 15, each of time intervals in which two or more WUR beacon periods are divided for each of WUR modules 1511, 1512, and 1513 of each WUR STA may be allocated.

A first WUR STA may receive odd-numbered WUR beacon frames (e.g., W #B1, W #B3, W #B5) based on the first WUR module 1511. Further, after receiving the odd-numbered WUR beacon frames (e.g., W #B1, W #B3, W #B5), the first WUR STA may maintain the first WUR module 1511 in a turn-on state for a predetermined time.

A second WUR STA may receive even-numbered WUR beacon frames (e.g., W #B2 and W #B4) based on the second WUR module 1512. Further, after receiving the even-numbered WUR beacon frames (e.g., W #B2 and W #B4), the second WUR STA may maintain the second WUR module 1512 in a turn-on state for a predetermined time.

A third WUR STA may receive odd-numbered WUR beacon frames (e.g., W #B1, W #B3, W #B5) based on the third WUR module 1513. Further, after receiving the odd-numbered WUR beacon frames (e.g., W #B1, W #B3, W #B5), the first WUR STA may maintain the third WUR module 1513 in a turn-on state for a predetermined time.

Figure 16:
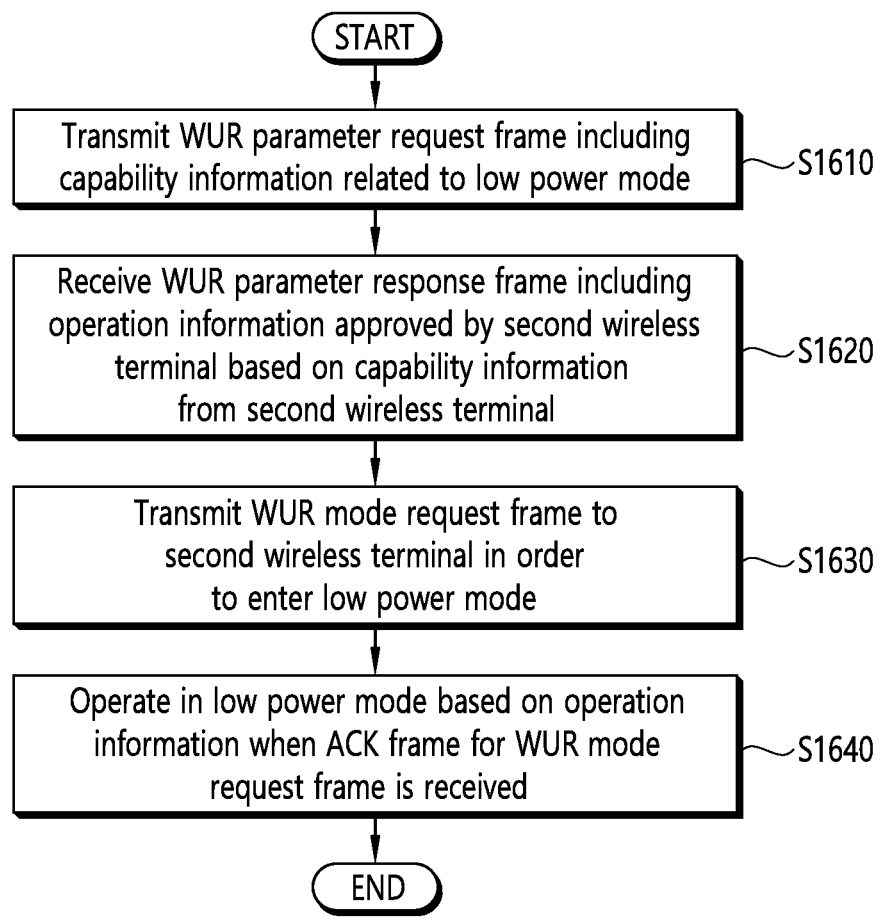
FIG. 16 is a flowchart illustrating a method of receiving a frame in a WLAN system according to the present embodiment.

FIG. 16 is a flowchart illustrating a method of receiving a frame in a WLAN system according to the present embodiment.

Referring to FIGS. 1 to 16, in step S1610, a first wireless terminal may transmit a WUR parameter request frame including capability information of the first wireless terminal related to a low power mode to a second wireless terminal.

Hereinafter, the first wireless terminal may be understood as a WUR STA including a main radio module and a wake-up radio (WUR) module. The second wireless terminal may be understood as an AP.

Further, the low power mode may mean that the main radio module is in an inactive state and the WUR module is in a turn-on state.

For example, the WUR parameter request frame may be transmitted based on the main radio module in an active state.

In step S1620, the first wireless terminal may receive a WUR parameter response frame including operation information approved by the second wireless terminal based on capability information from the second wireless terminal.

For example, the operation information may include time information for the WUR beacon frame to be transmitted by the second wireless terminal. Further, the operation information may further include reference information for a reference time for receiving the WUR parameter response frame, information about a time for maintaining a low power mode, and period information for a transmission period of the WUR beacon frame. For example, the time information may be set to include information on a time from a reference time until the WUR beacon frame is received.

Further, the first wireless terminal may transmit an ACK frame for notifying successful reception of the WUR parameter response frame to the second wireless terminal.

In step S1630, after the first wireless terminal receives the WUR parameter response frame (or after transmitting an ACK frame for notifying successful reception of the WUR parameter response frame), in order to enter a low power mode, the first wireless terminal may transmit a WUR mode request frame to the second wireless terminal.

In this case, the WUR mode request frame may be transmitted based on the main radio module in an active state.

In step S1640, when an acknowledgment (ACK) frame for the WUR mode request frame is received from the second wireless terminal, the first wireless terminal may operate in a low power mode based on the operation information.

The WUR beacon frame may be received from the WUR module according to time information. The WUR beacon frame may include control information for the first wireless terminal to maintain synchronization with the second wireless terminal in a low power mode. The control information may be modulated according to an on-off keying (OOK) technique for the WUR module.

Further, a WUR beacon frame following the WUR beacon frame may be received periodically from the second wireless terminal according to a transmission period.

Figure 17:
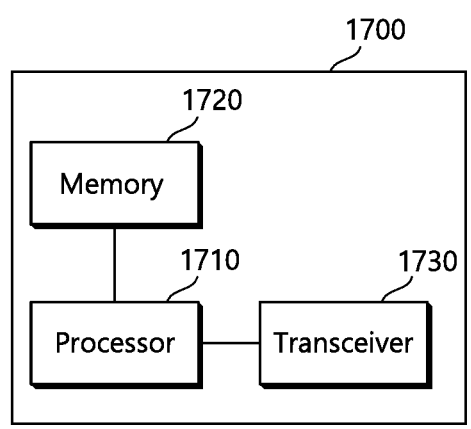
FIG. 17 is a block view illustrating a wireless device to which the exemplary embodiment of the present specification can be applied.

FIG. 17 is a block view illustrating a wireless device to which the exemplary embodiment of the present specification can be applied.

Referring to FIG. 17, as an STA that can implement the above-described exemplary embodiment, the wireless device may correspond to an AP or a non-AP station (STA). The wireless device may correspond to the above-described user or may correspond to a transmission device transmitting a signal to the user.

The wireless apparatus of FIG. 17, as shown, includes a processor 1710, a memory 1720 and a transceiver 1730. The illustrated processor 1710, memory 1720 and transceiver 1730 may be implemented as separate chips, respectively, or at least two blocks/functions may be implemented through a single chip.

The transceiver 1730 is a device including a transmitter and a receiver. If a specific operation is performed, only an operation of any one of the transmitter and the receiver may be performed or operations of both the transmitter and the receiver may be performed. The transceiver 1730 may include one or more antennas for transmitting and/or receiving a radio signal. Furthermore, the transceiver 1730 may include an amplifier for amplifying a received signal and/or a transmission signal and a bandpass filter for transmission on a specific frequency band.

The processor 1710 may implement the functions, processes and/or methods proposed in this specification. For example, the processor 1710 may perform the above-described operations according to the present embodiment. That is, processor 1710 may perform the operations disclosed in the embodiments of FIGS. 1 to 16.

The processor 1710 may include application-specific integrated circuits (ASIC), other chipsets, logic circuits, data processors and/or a converter for converting a baseband signal into a radio signal, and vice versa. The memory 1720 may include a read-only memory (ROM), a random access memory (RAM), a flash memory, a memory card, a storage medium and/or other storage devices.

In a detailed description of the present specification, specific embodiments have been described, but various modifications are possible without departing from the scope of the present specification. Therefore, the scope of the present specification should not be limited to the above-described embodiments, but should be determined not only by the claims below but also by the equivalents of the claims of the present specification.

What is claimed is:

1. A method of entering a wake-up radio (WUR) mode in a wireless local area network (WLAN) system performed by a first wireless terminal comprising a WLAN radio mode and the WUR mode, the method comprising:

receiving, from a second wireless terminal, a WUR parameter frame comprising operation information, wherein the operation information comprises:

first information on a time for a first WUR beacon frame to be transmitted by the second wireless terminal, second information on a transmission period of the first WUR beacon frame, third information on a reference time for receiving the WUR parameter frame, fourth information on a time for maintaining the WUR mode, and fifth information on a time from the reference time until the first WUR beacon frame is received; and based on the received operation information, performing an operation that comprises:

transmitting, to the second wireless terminal, a WUR mode request frame; and entering the WUR mode based on the WUR mode request frame, wherein the first WUR beacon frame is received in the WUR mode at a transmission time indicated by the first and fifth information, and the first WUR beacon frame comprises control information for enabling the first wireless terminal to maintain synchronization with the second wireless terminal in the WUR mode.

2. The method of claim 1, wherein the transmission time is determined based on a timing synchronization function (TSF) timer of the second wireless terminal.

3. The method of claim 1, wherein a second WUR beacon frame following the first WUR beacon frame is received from the second wireless terminal based on the transmission period.

4. The method of claim 1, wherein the WUR parameter frame is received in the WLAN radio mode, and the WLAN radio mode is in an active state when the WUR parameter frame is received.

5. The method of claim 1, wherein the WUR mode request frame is transmitted in the WLAN radio mode, and the WLAN radio mode is in an active state when the WUR mode request frame is transmitted.

6. The method of claim 1, further comprising transmitting, to the second wireless terminal, an ACK frame for notifying successful reception of the WUR parameter frame.

7. A first wireless terminal of entering a wake-up radio (WUR) mode in a wireless local area network (WLAN) system, the first wireless terminal comprises:

a transceiver for transmitting or receiving a wireless signal; and a processor for controlling the transceiver, wherein the processor is configured to:

receive, from a second wireless terminal, a WUR parameter frame comprising operation information, wherein the operation information comprises:

first information on a time for a first WUR beacon frame to be transmitted by the second wireless terminal, second information on period information for a transmission period of the first WUR beacon frame, third information on a reference time for receiving the WUR parameter frame, fourth information on a time for maintaining the WUR mode, and fifth information on a time from the reference time until the first WUR beacon frame is received, and based on the received operation information, performing an operation that comprises:

transmitting, to the second wireless terminal, a WUR mode request frame, and entering the WUR mode based on the WUR mode request frame, wherein the first WUR beacon frame is received in the WUR mode at a transmission time indicated by the first and fifth information, and the first WUR beacon frame comprises control information for enabling the first wireless terminal to maintain synchronization with the second wireless terminal in the WUR mode.

8. The wireless terminal of claim 7, wherein the transmission time is determined based on a timing synchronization function (TSF) timer of the second wireless terminal.

* * * * *